United States Patent [19]
Taniguchi

[11] Patent Number: 5,535,034
[45] Date of Patent: Jul. 9, 1996

[54] OPTICAL TRANSCEIVER UNIT

[75] Inventor: Shoji Taniguchi, Kawasaki, Japan

[73] Assignee: Fujitsu Limited, Kawasaki, Japan

[21] Appl. No.: 273,805

[22] Filed: Jul. 12, 1994

[30] Foreign Application Priority Data

Dec. 8, 1993 [JP] Japan ..................... 5-306934

[51] Int. Cl.⁶ ............... H04B 10/00; H04B 10/24
[52] U.S. Cl. ............ 359/152; 359/161; 359/163; 455/90; 455/117; 455/301
[58] Field of Search ................... 359/152, 153, 359/157, 161, 163; 455/90, 117, 128, 300, 301, 347–351

[56] References Cited

U.S. PATENT DOCUMENTS

| | | | |
|---|---|---|---|
| 4,549,314 | 10/1985 | Masuda et al. | 455/618 |
| 4,658,439 | 4/1987 | Danielson et al. | 455/301 |
| 5,150,282 | 9/1992 | Tomura et al. | 361/424 |
| 5,265,265 | 11/1993 | Hama et al. | 455/300 |

FOREIGN PATENT DOCUMENTS

| | | |
|---|---|---|
| 61-88624 | 5/1986 | Japan . |
| 64-16035 | 1/1989 | Japan . |
| 1-98299 | 4/1989 | Japan . |
| 2-113598 | 4/1990 | Japan . |

*Primary Examiner*—Leslie Pascal
*Attorney, Agent, or Firm*—Armstrong, Westerman, Hattori, McLeland & Naughton

[57] ABSTRACT

An optical transceiver unit capable of preventing any crosstalk from an optical transmitter to an optical receiver to thereby avert reduction of the reception sensitivity. The optical transceiver unit comprises a multilayer printed circuit board, a lower case for housing the multilayer printed circuit board therein, and an upper case so disposed as to cover the lower case for enclosing the multilayer printed circuit board in an assembly of the two cases. A light emitting element module and a light receiving element module are attached to one side wall of the lower case. The printed circuit board has a first region where a transmitting circuit is formed, and a second region where a receiving circuit is formed. The first and second regions are completely isolated electromagnetically from each other by a first shield plate fixed to the lower case and a second shield plate fixed to the upper case.

6 Claims, 4 Drawing Sheets

OPTICAL TRANSCEIVER UNIT

BACKGROUND OF THE INVENTION

1. Field of the Invention

The present invention relates to an optical transceiver unit comprising an optical transmitter and an optical receiver housed integrally in a single casing.

2. Description of the Related Art

It is known of late that an optical communication system using optical fiber as a transmission line is widely employed for a variety of purposes ranging from a basic transmission line in public communication channel to a short-distance network such as LAN (local area network). In the optical communication system, an optical transmitter having a light emitting element and performing electro-optical conversion is provided on the transmission side, while an optical receiver having a light receiving element and performing opto-electric conversion is provided on the reception side. It is important particularly in a short-distance network to contrive a compact structure which incorporates both an optical transmitter and an optical receiver at low production cost in the optical transmission system.

For enabling bidirectional transmission, both an optical transmitter and an optical receiver need to be incorporated in a communication terminal apparatus and, in view of production cost, an advantage is attainable by mounting such transmitter and receiver on a single printed circuit board. However, the optical transmitter requires a great current for modulation of a light emitting element such as a laser diode, whereas the optical receiver deals with a feeble current obtained from the light receiving element and is therefore prone to be affected electromagnetically by the optical transmitter, so that an adequate electromagnetic shield means needs to be carried out between them.

Under such technical background mentioned above, it has been generally customary heretofore to adopt exemplary proper methods of: (a) disposing an optical transmitter and an optical receiver on the same or different printed circuit boards with a sufficient space kept therebetween; or (b) housing an optical transmitter and an optical receiver in individual shield cases separately. However, according to the first method (a), it is difficult to attain a high mounting density with a concomitant problem that the whole unit is rendered dimensionally greater. Meanwhile according to the second method (b), a rise of the production cost is unavoidable in addition to a dimensional increase of the whole unit.

Some exemplary optical transceiver units developed in an attempt to shield an optical receiver electromagnetically from an optical transmitter while averting a dimensional increase of the whole structure are disclosed in, for example, Japanese Patent Laid-open Nos. Sho 61 (1986)-88624, Hei 1 (1989)-16035 and Hei 1 (1989)-98299. In each of the conventional optical transceiver units described in the above, a light receiving element module and a receiving circuit are mounted on one surface of a printed circuit board where, e.g., two shield layers are laminated, while a light emitting element module and a transmitting circuit are mounted on the other surface of the printed circuit board.

In any of such known optical transceiver units, the shield layers for electromagnetically shielding the component elements of the receiving circuit inclusive of a preamplifier and so forth from the transmitting circuit are formed integrally with the printed circuit board, so that the whole unit can be down-sized to a certain extent. However, since the transmitting circuit is greater in circuit scale than the receiving circuit, the size of the printed circuit board is determined depending on the circuit scale of the transmitting circuit in the above-described related art which mounts the light receiving element module and the receiving circuit on one surface of the printed circuit board while mounting the light emitting element module and the transmitting circuit on the other surface thereof.

Consequently it follows that a sufficient margin space is left on the surface of the printed circuit board where the receiving circuit is to be disposed, and such a structure is undesirable in view of attaining a high mounting density. Further, since lead terminals on the printed circuit board project from its one surface, there exists another problem that the receiving circuit or the transmitting circuit mounted on the surface with the projecting lead terminals is harmfully affected by electromagnetic interference caused due to the electromagnetic waves emitted from the lead terminals.

SUMMARY OF THE INVENTION

It is therefore an object of the present invention to provide an improved optical transceiver unit which is capable of preventing any crosstalk from an optical transmitter to an optical receiver to thereby avert reduction of the reception sensitivity.

Another object of the present invention is to provide a down-sized optical transceiver unit having enhanced thermal radiation characteristics.

In accordance with an aspect of the present invention, there is provided an optical transceiver unit which comprises a multilayer printed circuit board having signal layers, power supply layers and ground layers, where a plurality of signal leads, power supply leads and ground leads are soldered in a manner to project downward; a lower case for housing the multilayer printed circuit board therein; an upper case so disposed as to cover the lower case to enclose the multilayer printed circuit board in an assembly of the two cases; a light emitting element module attached to one side wall of the lower case and connected electrically to the multilayer printed circuit board so as to convert a modulated electric signal into an optical signal; a light receiving element module attached to one side wall of the lower case substantially in parallel with the light emitting element module and connected electrically to the multilayer printed circuit board; a transmitting circuit formed in a first region of the multilayer printed circuit board so as to supply the modulated electric signal to the light emitting element module; a receiving circuit formed in a second region of the multilayer printed circuit board so as to amplify the electric signal obtained through opto-electric conversion by the light receiving element module; a first shield plate fixed to the lower case in a manner that its upper end is kept in contact with the lower surface of the multilayer printed circuit board so as to isolate the receiving circuit electromagnetically from the transmitting circuit; and a second shield plate fixed to the upper case substantially in parallel with the first shield plate in a manner that its lower end is held in the proximity of the upper surface of the multilayer printed circuit board so as to isolate the receiving circuit electromagnetically from the transmitting circuit.

Preferably the signal layers, the power supply layers and the ground layers of the multilayer printed-circuit board are completely isolated between the first region having the transmitting circuit and the second region having the receiving circuit, and the first shield plate is connected electrically to the ground layer in the second region. Further preferably, the transmitting circuit is formed on both upper and lower surfaces of the first region in the multilayer printed circuit board, and the receiving circuit is formed on both upper and lower surfaces of the second region.

According to the construction of the present invention, the first region of the multilayer printed circuit board having the transmitting circuit and the second region thereof having the receiving circuit are completely isolated from each other electromagnetically by means of the first and second shield plates fixed respectively to the lower case and the upper case. Furthermore, due to the structure where the first shield plate fixed to the lower case is connected to the ground layer in the second region of the printed circuit board having the receiving circuit thereon, it becomes possible to prevent any crosstalk of the signal from the transmitting circuit to the receiving circuit, thereby averting reduction of the reception sensitivity that may otherwise be caused by the crosstalk.

In addition, since the plurality of leads project downward through the openings in the lower case, thermal radiation can be achieved efficiently via the power supply leads connected to the power supply layer and also via the ground leads connected to the ground layer, hence enhancing the thermal radiation characteristics of the multilayer printed circuit board.

The above and other objects, features and advantages of the present invention and the manner of realizing them will become more apparent, and the invention itself will best be understood from a study of the following description and the appended claims with reference to the attached drawings showing a preferred embodiment of the invention.

DESCRIPTION OF THE PREFERRED EMBODIMENT

Hereinafter a preferred embodiment of the present invention will be described in detail with reference to the accompanying drawings.

Figure 1:
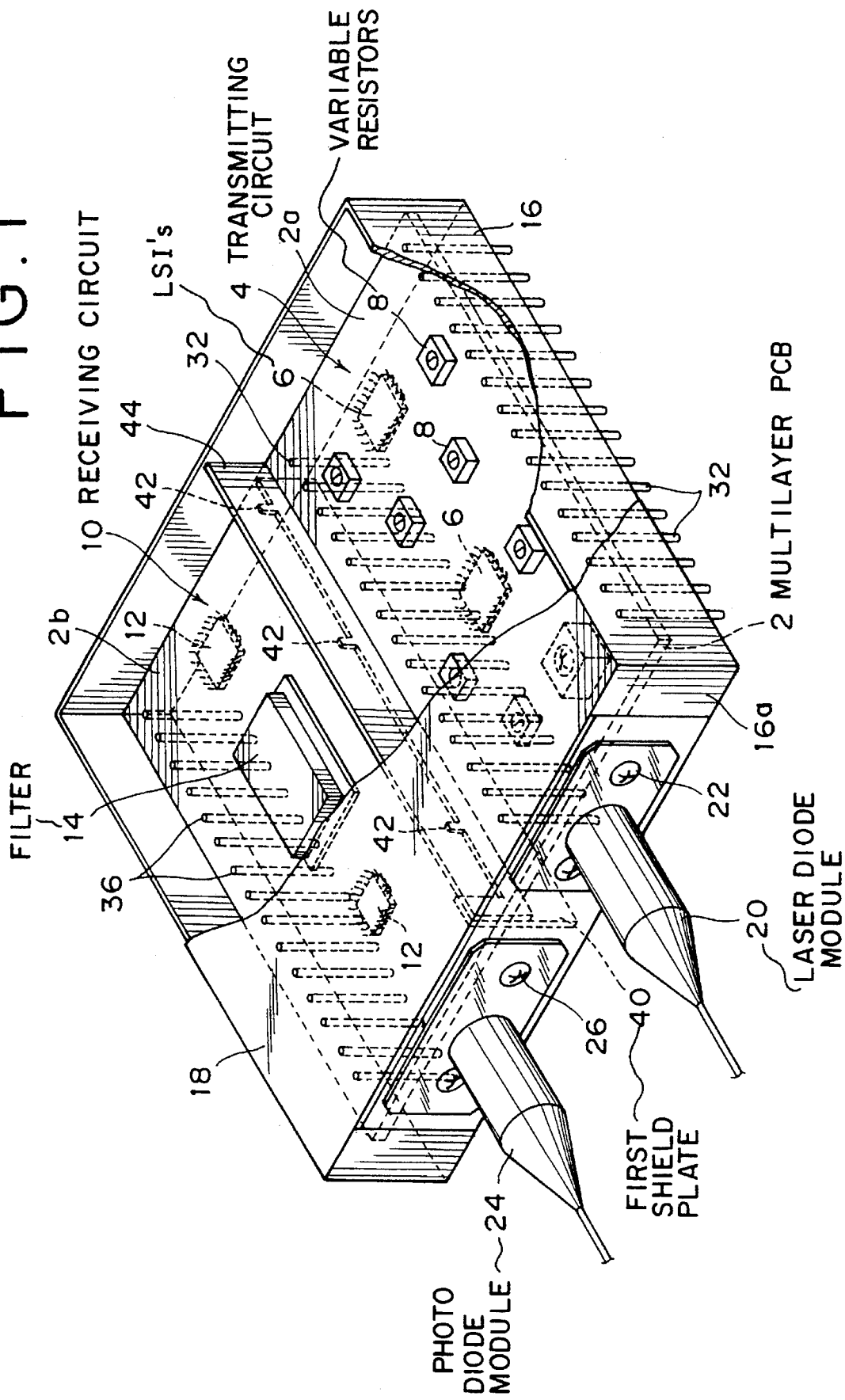
FIG. 1 is a partially cutaway perspective view of an optical transceiver unit in a preferred embodiment of the present invention.

Referring first to FIG. 1, there is shown a partially cutaway perspective view of an optical transceiver unit according to the embodiment of the invention, wherein a transmitting circuit 4 including a plurality of LSIs 6, a plurality of variable resistors 8 and so forth is provided in a first region 2a of a multilayer printed circuit board 2. In the embodiment of FIG. 1, the LSIs 6 are mounted on the reverse surface of the printed circuit board 2, while the variable resistors 8 are mounted on the obverse surface of the printed circuit board 2. And a receiving circuit 10 including a plurality of LSIs 12, a filter 14 and so forth is provided in a second region 2b of the printed circuit board 2. The LSIs 12 are mounted on the reverse surface of the printed circuit board 2, while the filter 14 is mounted on the obverse surface of the printed circuit board 2.

The multilayer printed circuit board 2 is housed in a lower case 16 composed of an iron sheet. And an upper case 18 composed similarly of an iron sheet is so disposed as to cover the lower case 16, whereby the printed circuit board 2 and the transmitting and receiving circuits 4, 10 are completely enclosed in the casing. A laser diode module (LD module) 20 is fixed by means of screws 22 to one side wall 16a of the lower case 16, and further a photo diode module (PD module) 24 is fixed by means of screws 26 substantially in parallel with the LD module 20.

Figure 2:
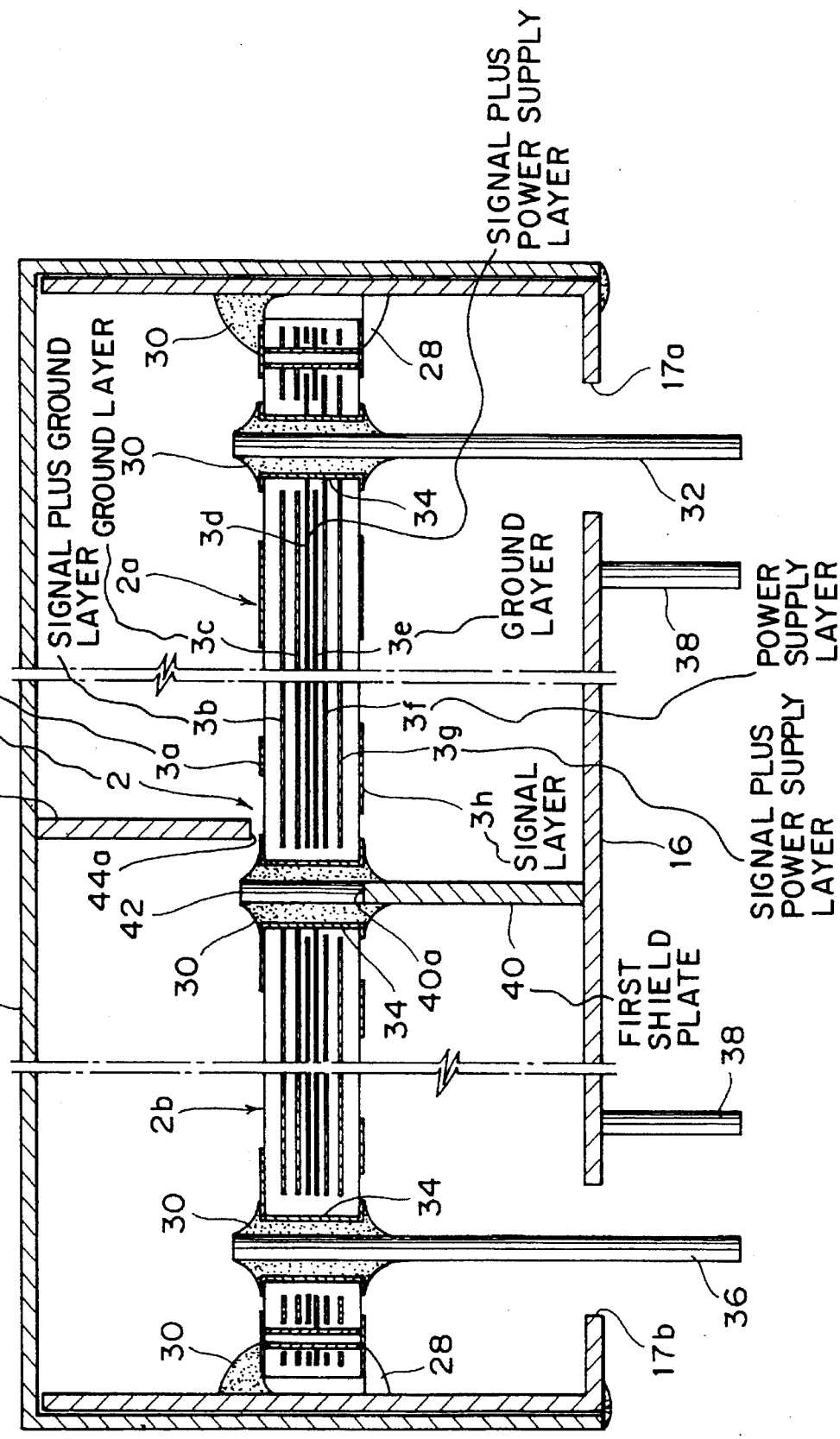
FIG. 2 is a vertical sectional view of the optical transceiver unit in the embodiment of the invention.

Referring to FIG. 2, the multilayer printed circuit board 2 includes eight conductive layers. More specifically, the multilayer printed circuit board 2 includes a signal layer 3a, a signal plus ground layer 3b, a ground layer 3c, a signal plus power supply layer 3d, a ground layer 3e, a power supply layer 3f, a signal plus power supply layer 3g, and a signal layer 3h. The layers 3a to 3h are completely isolated from one another by the first region 2a of the printed circuit board 2 where the transmitting circuit 4 is provided, and by the second region 2b thereof where the receiving circuit 10 is provided. The printed circuit board 2 is mounted on support projections 28 anchored to the inner walls of the lower case 16, and the upper side of the printed circuit board 2 is soldered to the inner walls of the lower case 16 at a plurality of positions with solder 30.

Referring to FIG. 1 again, two rows of leads 32 are provided in the first region 2a of the printed circuit board 2, and one row of leads 36 are provided in the second region 2b thereof. Each row of the leads 32 and 36 includes a plurality of signal leads, power supply leads and ground leads. As illustrated in FIG. 2, such leads 32 and 36 are inserted and soldered in plated through holes 34 as shown in FIG. 2 and project downward from the lower case 16 via openings 17a and 17b formed in the lower case 16.

The lead 32 illustrated in FIG. 2 is used for power supply and is connected to the signal plus power supply layer 3d, the power supply layer 3f and the signal plus power supply layer 3g provided in the first region 2a of the printed circuit board 2. Meanwhile the lead 36 is used for signals and is connected to the signal layers 3a and 3h provided in the second region 2b of the printed circuit board 2. The ground leads 38 are anchored to the lower case 16 and project downward from the lower case 16. A first shield plate 40 composed of an iron sheet is welded at a plurality of spots to the inner wall of the lower case 16, and an upper end 40a of the first shield plate 40 is kept in contact with the lower surface of the printed circuit board 2.

A plurality of projections 42 are formed at the upper end 40a of the first shield plate 40 and are inserted into and soldered to plated through holes 34 formed in the printed circuit board 2. In this manner, the printed circuit board 2 is held at both side edges thereof by the support projections 28 while being held in the middle portion thereof by the first shield plate 40. The first shield plate 40 is connected to the ground layers 3b, 3c and 3e formed in the second region 2b of the printed circuit board 2 having the receiving circuit 10. A second shield plate 44 composed of an iron sheet welded at a plurality of spots to the inner wall of the upper case 18, and a lower end 44a of the second shield plate 44 is disposed in the proximity of the upper surface of the printed circuit board 2 with a space of 0.1 to 0.2 mm or so kept therebetween.

Figure 3:
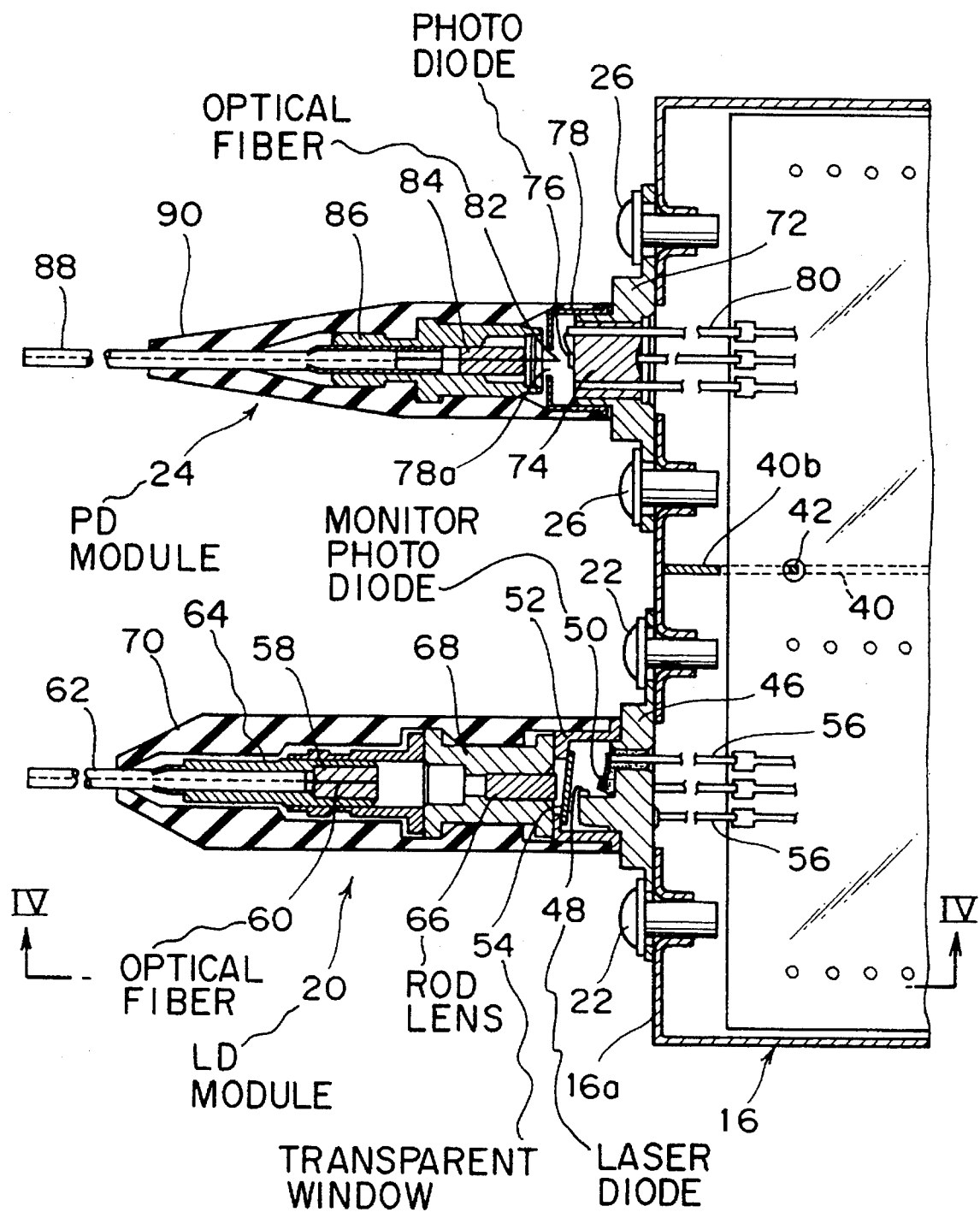
FIG. 3 is a cross sectional view illustrating how a laser diode module and a photo diode module are attached.

Referring now to FIG. 3, there is shown a cross sectional view which illustrates how the LD and PD modules are attached in the embodiment of the present invention. The LD module 20 is fixed to one side wall 16a of the lower case 16 with its anchor base 46 being secured by means of screws 22. On the anchor base 46, there are mounted a laser diode 48 and a monitor photo diode 50. As illustrated in FIG. 3, the laser diode 48 and the monitor photo diode 50 are connected to a conductor pattern formed on the printed circuit board 2 with leads 56 being soldered to pads of the printed circuit board 2. Both the laser diode 48 and the monitor photo diode 50 are housed in a cap 52 having a transparent window 54.

An optical fiber 60 stripped of its sheath 62 is inserted and fixed in a ferrule 58 which is inserted into a holder 64. Denoted by reference numeral 66 is a rod lens inserted into a holder 68 to collimate a laser beam emitted from the laser diode 48. The cap 52 and the holders 64, 68 are covered with a rubber cap 70.

Meanwhile the PD module 24 is fixed to the side wall 16a of the lower case 16 substantially in parallel with the LD module 20 in a state where its anchor plate 72 is secured by means of screws 26. And a photo diode 76 is mounted on a base 74 fixed to the anchor plate 72. The photo diode is connected to a conductor pattern on the printed circuit board 2 with leads 80 being soldered to pads of the printed circuit board 2.

The photo diode 76 is housed in a cap 78 having an opening 78a. An optical fiber 82 stripped of its sheath 88 is inserted into a fiber guide 84 in such a manner that its leading end is guided up to the proximity of the photo diode 76 by way of the opening 78a in the cap 78. The leading end of the optical fiber is so finished as to be spherical. The fiber guide 84 is housed in a holder 86, and both the cap 78 and the holder 86 are covered with a rubber cap 90.

Figure 4:
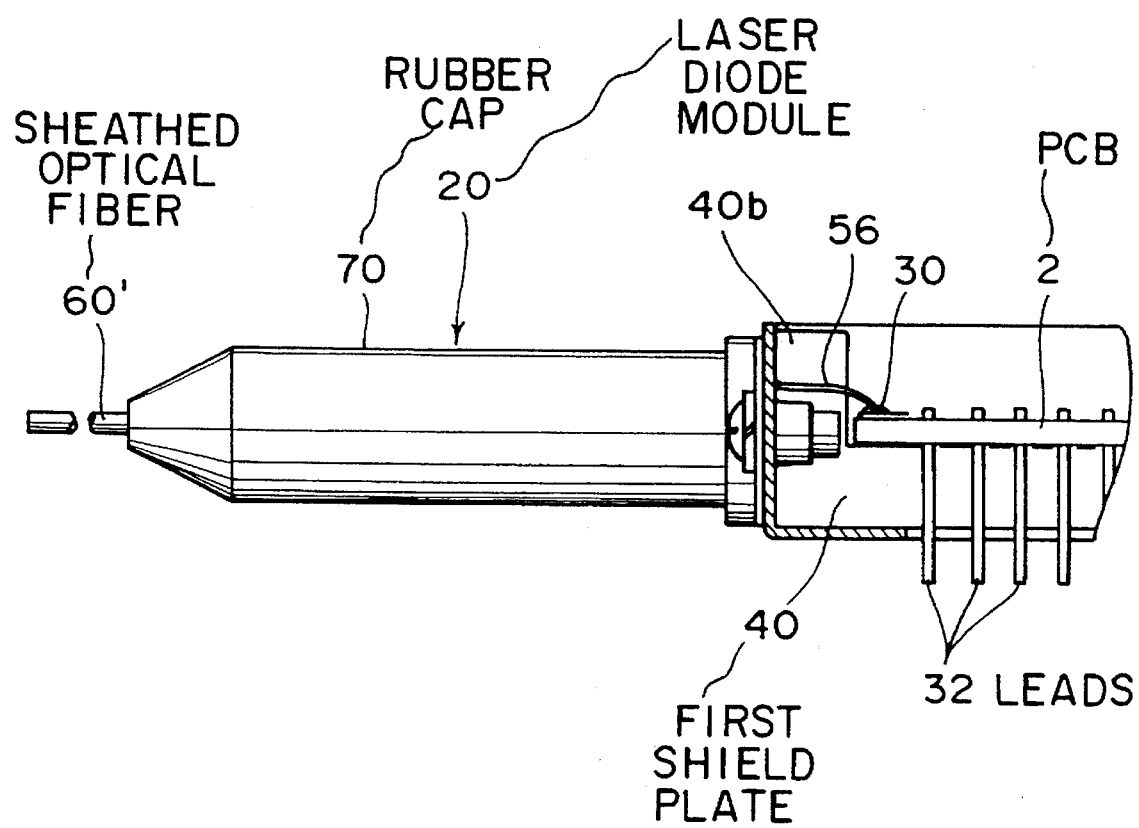
FIG. 4 is a sectional view taken along the line IV—IV in FIG. 3.

Referring next to FIG. 4, the first shield plate 40 has, at its one end, an upright portion 40b which extends upward via a space between the printed circuit board 2 and the side wall 16a of the lower case 16. Reference numeral 60' denotes a sheathed optical fiber.

Since the optical transceiver unit of the embodiment is so constructed as described in detail hereinabove, the transmitting circuit 4 and the receiving circuit 10 can be completely shielded electromagnetically by the upper and lower cases 16, 18 and the first and second shield plates 40, 44. And in addition to the construction mentioned, the first shield plate 40 is connected to the ground layers 3b, 3c, 3e formed in the second region 2b of the printed circuit board 2 having the receiving circuit 10, so that it becomes possible to effectively prevent any crosstalk of the signal from the transmitting circuit 4 to the receiving circuit 10, hence averting a reduction of the reception sensitivity.

Furthermore, due to the inner existence of the plural power supply layers and ground layers on the printed circuit board 2, connection of such power supply layers and ground layers to the leads 32 and 36 enhances the thermal radiation characteristics of the printed circuit board 2.

What is claimed is:

1. An optical transceiver unit comprising:

a multilayer printed circuit board having signal layers, power supply layers and ground layers, wherein a plurality of signal leads, power supply leads and ground leads are soldered in such a manner as to project downward, said multilayer printed circuit board having a first region and a second region;

a lower case for housing said multilayer printed circuit board therein;

an upper case so disposed as to cover said lower case to enclose said multilayer printed circuit board in an assembly of said two cases;

a light emitting element module attached to one side wall of said lower case and connected electrically to said multilayer printed circuit board so as to convert an electric signal into an optical signal;

a light receiving element module attached to the one side wall of said lower case substantially in parallel with said light emitting element module an connected electrically to said multilayer printed circuit board;

a transmitting circuit formed on both upper and lower surfaces in said first region of said multilayer printed circuit board so as to supply the modulated electric signal to said light emitting element module;

a receiving circuit formed on both upper and lower surfaces in said second region of said multilayer printed circuit board so as amplify the electric signal obtained through opto-electric conversion by said light receiving element module;

a first shield plate fixed to said lower case in a manner that its upper end is kept in contact with the lower surface of said multilayer printed circuit board so as to isolate said receiving circuit electromagnetically from said transmitting circuit; and a second shield plate fixed to said upper case substantially in parallel with said first shield plate in a manner that its lower end is held in the proximity of the upper surface of said multilayer printed circuit board so as to isolate said receiving circuit electromagnetically from said transmitting circuit;

wherein said signal layer, said power supply layer and said ground layer of said transmitting circuit are completely isolated from those of said receiving circuit in said multilayer printed circuit board; and wherein said first shield plate has a plurality of projections at its upper end, said projections being inserted into and soldered to plated through holes in said multilayer printed circuit board.

2. The optical transceiver unit according to claim 1, wherein said first shield plate is connected to the ground layers of said multilayer printed circuit board.

3. The optical transceiver unit according to claim 2, wherein said lower case has a plurality of support projections extending inward, and said multilayer printed circuit board is supported on said projections while being soldered to the inner wall of said lower case.

4. The optical transceiver unit according to claim 3, wherein said signal leads, power supply leads and ground leads extend through said lower case and project downward therefrom.

5. The optical transceiver unit according to claim 1, wherein said first shield plate is connected to the ground layer of said receiving circuit.

6. An optical transceiver unit comprising:

a multilayer printed circuit board having signal layers, power supply layers and ground layers, and possessing a plurality of electrically independent regions inclusive of a first region and a second region;

a plurality of leads connected respectively to the signal layers, power supply layers and ground layers of said multilayer printed circuit board;

a case enclosing said multilayer printed circuit board therein;

a light emitting element module attached to said case and connected electrically to said multilayer printed circuit board for converting a modulated electric signal into an optical signal;

a light receiving element module attached to said case and connected electrically to said multilayer printed circuit board;

a transmitting circuit for supplying the modulated electric signal to said light emitting element module, said transmitting circuit being mounted on both obverse and reverse surfaces of said multilayer printed circuit board and disposed in said first region connected to said light emitting element module;

a receiving circuit for amplifying the electric signal obtained through opto-electric conversion by said light receiving element module, said receiving circuit being mounted on both obverse and reverse surface of said multilayer printed circuit board and disposed in said second region connected to said light receiving element module; and a plurality of shield plates disposed in said case and serving to isolate said first and second regions electromagnetically from each other.

\* \* \* \* \*